(12) United States Patent
Li et al.

(10) Patent No.: US 11,721,854 B2
(45) Date of Patent: Aug. 8, 2023

(54) BATTERY THERMAL MANAGEMENT SYSTEM AND METHOD

(71) Applicant: Guangzhou Automobile Group Co., Ltd., Guangdong (CN)

(72) Inventors: Xiaohui Li, Sunnyvale, CA (US); Bozhi Yang, Sunnyvale, CA (US); Qin Yang, Sunnyvale, CA (US); Meng Yao, Sunnyvale, CA (US)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 232 days.

(21) Appl. No.: 17/023,326

(22) Filed: Sep. 16, 2020

(65) Prior Publication Data
US 2022/0085438 A1   Mar. 17, 2022

(51) Int. Cl.
H01M 10/6556   (2014.01)
H01M 10/6568   (2014.01)
H01M 10/6563   (2014.01)
H01M 10/6569   (2014.01)
H01M 10/613    (2014.01)
H01M 10/63     (2014.01)

(52) U.S. Cl.
CPC ... H01M 10/6556 (2015.04); H01M 10/6568 (2015.04)

(58) Field of Classification Search
None
See application file for complete search history.

(56) References Cited

U.S. PATENT DOCUMENTS

| 2018/0178615 A1* | 6/2018 | Xia | B60H 1/323 |
| 2020/0185796 A1* | 6/2020 | Stenvall | B60L 50/66 |
| 2021/0351466 A1* | 11/2021 | Wang | H02J 7/0024 |

FOREIGN PATENT DOCUMENTS

| CN | 108682879 A | 10/2018 |
| CN | 108808158 A | 11/2018 |

\* cited by examiner

*Primary Examiner* — Lisa S Park
(74) *Attorney, Agent, or Firm* — ScienBiziP, P.C.

(57) ABSTRACT

A battery thermal management system and method are provided. The system includes: a battery, a battery thermal exchange structure, a pump, at least one first valve and one or more thermal adjustment components, wherein the battery thermal exchange structure includes a thermal exchange channel passing through the battery, and has a first port and a second port; a first coolant circulation loop is formed via connecting the pump and the battery thermal exchange structure, and a second coolant circulation loop is formed via connecting the pump, the battery thermal exchange structure and the one or more thermal adjustment components; the first valve is set at each or one of two joint locations between the first coolant circulation loop and the second coolant circulation loop and is configured to direct coolant flowing through the first valve into either the first coolant circulation loop or the second coolant circulation loop.

14 Claims, 10 Drawing Sheets

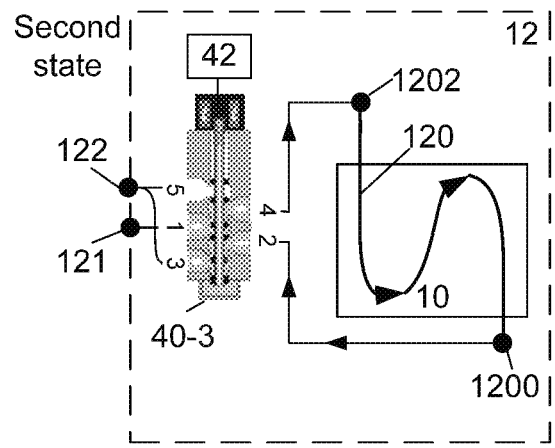
Fig. 9(b)
Control coolant to circulate in either the first coolant circulation loop or the second coolant circulation loop via switching of at least one valve — S1002
Fig. 10
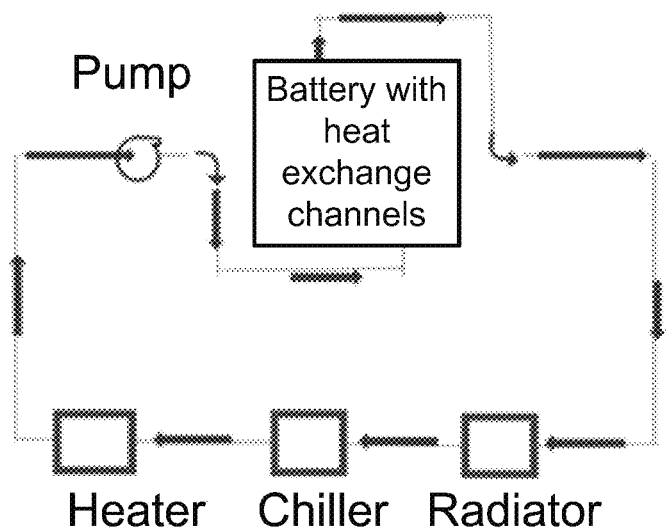
Fig. 11(a)

BATTERY THERMAL MANAGEMENT SYSTEM AND METHOD

TECHNICAL FIELD

The present disclosure relates to the field of battery thermal management, in particular to a battery thermal management system and method.

BACKGROUND

Electric vehicles are developing fast and have become a major developing trend for future transportation. An electric-vehicle battery (EVB, also known as a traction battery) is a battery used to power electric motors of an electric vehicle. As a key component in an electric vehicle, a battery may generate excess heat and thus require thermal management to improve the reliability and safety of the electric vehicle. For a battery pack, it is important to adopt certain means to keep the battery pack in a desired temperature range for optimum performance and life, and a good temperature uniformity within the battery pack is highly desired in the battery pack of electric vehicles since uneven distribution of temperature throughout the battery pack would lead to reduced performance.

SUMMARY

The following presents a simplified summary in order to provide a basic understanding of some aspects of the present disclosure. This summary is not an extensive overview of the present disclosure. It is intended neither to identify key or critical element of the present disclosure. The following summary merely presents some concepts of the present disclosure in a simplified form as a prelude to the description below.

In accordance with an aspect of the embodiments of the present disclosure, a battery thermal management system is provided. The battery thermal management system includes: a battery, a battery thermal exchange structure, a pump, at least one first valve and one or more thermal adjustment components, wherein the battery thermal exchange structure includes a thermal exchange channel passing through the battery, and has a first port and a second port; a first coolant circulation loop is formed via connecting a first port of the pump to the first port of the battery thermal exchange structure and connecting a second port of the pump to the second port of the battery thermal exchange structure, and a second coolant circulation loop is formed via connecting the first port of the pump to the first port of the battery thermal exchange structure and sequentially connecting the second port of the pump to the one or more thermal adjustment components and the second port of the battery thermal exchange structure; the first valve is set at each or one of two joint locations between the first coolant circulation loop and the second coolant circulation loop and is configured to direct coolant flowing through the first valve into either the first coolant circulation loop or the second coolant circulation loop.

In at least one exemplary embodiment, the first port of the pump is an outlet of the pump and the second port of the pump is an inlet of the pump, or the first port of the pump is the inlet of the pump and the second port of the pump is the outlet of the pump.

In at least one exemplary embodiment, the first valve is a three-way valve.

In at least one exemplary embodiment, the battery thermal management system further includes a first control component in connection with the first valve and configured to: determine whether active heating or cooling of the battery is needed; in a case where the active heating or cooling of the battery is not needed, trigger the first valve to direct the coolant flowing through the first valve into the first coolant circulation loop; and/or, in a case where the active heating or cooling of the battery is needed, trigger the first valve to direct the coolant flowing through the first valve into the second coolant circulation loop.

In at least one exemplary embodiment, the first control component is configured to: determine that the active heating or cooling of the battery is not needed in a case where a temperature of the battery does not exceed a temperature threshold; and determine that the active heating or cooling of the battery is needed in a case where the temperature of the battery exceeds the temperature threshold.

In at least one exemplary embodiment, a first end and a second end of the thermal exchange channel passing through the battery respectively serve as the first port and the second port of the battery thermal exchange structure.

In at least one exemplary embodiment, the battery thermal exchange structure further includes at least one second valve, wherein two ports of the second valve are connected with a first end and a second end of the thermal exchange channel passing through the battery, and remaining port or ports of the second valve serves as the first port and the second port of the battery thermal exchange structure; the second valve is configured to alter a flowing direction of the coolant within the thermal exchange channel passing through the battery.

In at least one exemplary embodiment, the battery thermal management system further includes a second control component in connection with the second valve and configured to send a flowing direction altering command to the second valve at a preset interval, wherein the flowing direction altering command is used for instructing the second valve to alter the flowing direction of the coolant within the thermal exchange channel passing through the battery.

In at least one exemplary embodiment, there are two second valves, and the two second valves are three-way valves, respectively being a first three-way valve and a second three-way valve, a first port and a second port of the first three-way valve are respectively connected with the first end and the second end of the thermal exchange channel passing through the battery, and a third port of the first three-way valve serves as the first port of the battery thermal exchange structure; a first port and a second port of the second three-way valve are respectively connected with the first end and the second end of the thermal exchange channel passing through the battery, and a third port of the second three-way valve serves as the second port of the battery thermal exchange structure.

In at least one exemplary embodiment, the first three-way valve has a first state in which the first and third ports of the first three-way valve are connected and a second state in which the second and third ports of the first three-way valve are connected, and the second three-way valve has a first state in which the second and third ports of the second three-way valve are connected and a second state in which the first and third ports of the second three-way valve are connected; and the first and second three-way valves alter the flowing direction of the coolant within the thermal exchange channel passing through the battery by simultaneously shifting from their respective first states to their respective second states, or from their respective second states to their respective first states.

In at least one exemplary embodiment, there is one second valve, and the second valve is a four-way valve, a first port and a second port of the four-way valve are respectively connected with the first end and the second end of the thermal exchange channel passing through the battery, and a third port and a fourth port of the four-way valve respectively serve as the first port and the second port of the battery thermal exchange structure.

In at least one exemplary embodiment, the four-way valve has a first state in which the first and fourth ports of the four-way valve are connected and the second and third ports of the four-way valve are connected, and a second state in which the first and third ports of the four-way valve are connected and the second and fourth ports of the four-way valve are connected; and the four-way valve alters the flowing direction of the coolant within the thermal exchange channel passing through the battery by shifting from the first state to the second state, or from the second state to the first state.

In at least one exemplary embodiment, there is one second valve, and the second valve is a five-way valve, a port 2 and a port 4 of the five-way valve are respectively connected with the first end and the second end of the thermal exchange channel passing through the battery, and a port 1 and a port 3/5 of the five-way valve respectively serve as the first port and the second port of the battery thermal exchange structure.

In at least one exemplary embodiment, the five-way valve has a first state in which the port 1 and port 4 of the five-way valve are connected, and a second state in which the port 1 and port 2 of the five-way valve are connected; and the five-way valve alters the flowing direction of the coolant within the thermal exchange channel passing through the battery by shifting from the first state to the second state, or from the second state to the first state.

In at least one exemplary embodiment, the one or more thermal adjustment components include at least one of: a heating component, a cooling component, and a radiating component.

In accordance with another aspect of the embodiments of the present disclosure, a battery thermal management method is provided. The battery thermal management method is implemented in a battery thermal management system having a first coolant circulation loop and a second circulation loop, wherein the first coolant loop passes a pump and a thermal exchange channel inside a battery while bypasses one or more thermal adjustment components, and the second coolant loop passes the pump, the thermal exchange channel, and one or more thermal adjustment components. The battery thermal management method includes: controlling coolant to circulate in either the first coolant circulation loop or the second coolant circulation loop via switching of at least one valve.

In at least one exemplary embodiment, controlling coolant to circulate in either the first coolant circulation loop or the second coolant circulation loop via switching of at least one valve includes: determining whether active heating or cooling of the battery is needed; in a case where the active heating or cooling of the battery is not needed, controlling the coolant to circulate in the first coolant circulation loop via switching of the at least one valve; and/or, in a case where the active heating or cooling of the battery is needed, controlling the coolant to circulate in the second coolant circulation loop via switching of the at least one valve.

In at least one exemplary embodiment, determining whether active heating or cooling of the battery is needed includes: determining that the active heating or cooling of the battery is not needed in a case where a temperature of the battery does not exceed a temperature threshold; and determining that the active heating or cooling of the battery is needed in a case where the temperature of the battery exceeds the temperature threshold.

In at least one exemplary embodiment, the battery thermal management method further includes: alternately switching a flowing direction of the coolant within the thermal exchange channel passing through the battery.

In at least one exemplary embodiment, alternately switching a flowing direction of the coolant within the thermal exchange channel passing through the battery includes: alternately switching the flowing direction of the coolant within the thermal exchange channel passing through the battery via connecting two three-way valves, or a four-way valve, or a five-way valve with two ends of the thermal exchange channel.

BRIEF DESCRIPTION OF THE DRAWINGS

The accompanying drawings described here are used for providing a deeper understanding of the present disclosure, and constitute a part of the application; schematic embodiments of the present disclosure and description thereof are used for illustrating the present disclosure and not intended to form an improper limit to the present disclosure. In the accompanying drawings:

FIG. 9(a) and FIG. 9(b) are schematic diagrams showing working states of the five-way valve 40-3 according to an embodiment of the present disclosure;

FIG. 10 is a flowchart of a battery thermal management method according to an embodiment of the present disclosure;

FIG. 11(a) and FIG. 11(b) are schematic diagrams respectively showing circulating coolant in the commonly used loop for battery thermal management and improved coolant loop which has a short-cut flow path, forming a smaller coolant loop;

DETAILED DESCRIPTION OF THE EMBODIMENTS

Figure 1:
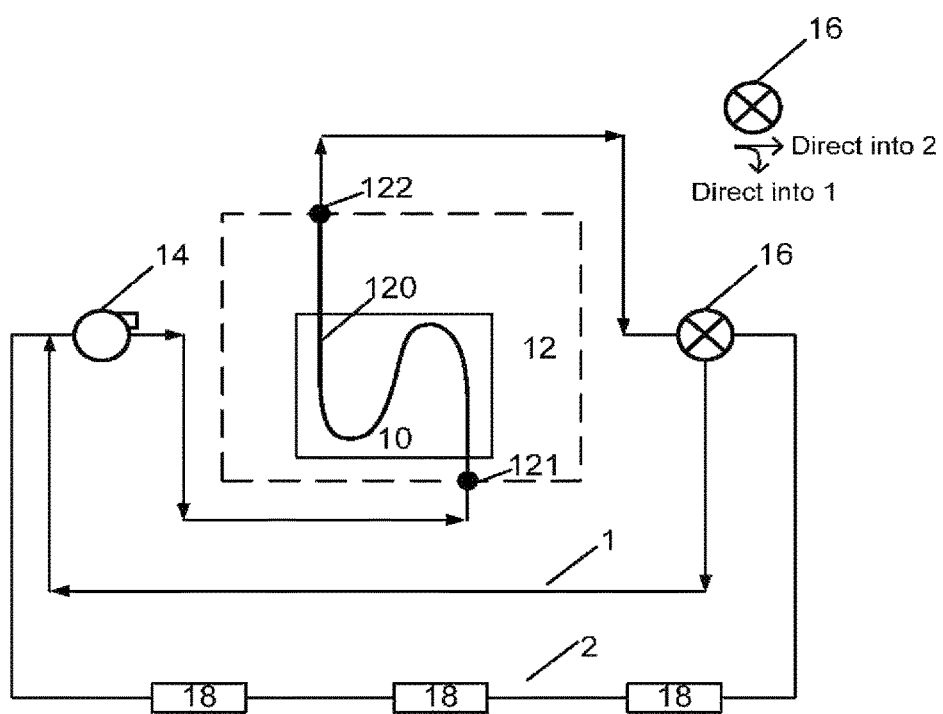
FIG. 1 is a schematic diagram of the structure of a battery thermal management system according to an embodiment of the present disclosure.

Currently most battery thermal management schemes are based on circulating a coolant loop to heat up or cool down the battery pack as needed. In these schemes, the coolant (in the form of, e.g., liquid, gas or multi-phase flow) usually flows in the same direction long the closed loop, and generally passes all the components in the loop. These schemes have the following defects.

Since coolant temperature increases along flow path during battery cooling and decrease along flow path during battery heating, the cooling or heating ability of the fluid would decrease along the flow path. Such one-directional flow would by its nature lead to a temperature non-uniformity for the entire battery pack. In lots of simulation even when there is no need for heating up or cooling down of the battery pack (e.g., battery temperature still within its limit), there is still significant temperature gradient (non-uniformity) inside battery pack due to heat generation inside battery cell. In both situations above, it is desired to reduce the temperature non-uniformity inside the battery pack.

Also, in current battery thermal management system, various components of the existing coolant loop, such as radiator, liquid-liquid heat exchanger, long hoses, valves, etc., can lead to significant pressure drop, and energy loss. In order to circulate coolant while save energy, some of these components can be bypassed, to save energy loss, and heat exchange to ambient.

In view of the above, the embodiments of the present disclosure propose an idea of introducing a short-cut loop (small loop) to the regular coolant loop for the battery pack. The pressure drop along the short-cut loop is minimized since the small loop bypasses the heating and cooling components (high-voltage heater, radiator and chiller, etc.). Therefore, coolant can circulate just in this short-cut loop to improve temperature uniformity, with less energy consumption. In some embodiments of the present disclosure, an idea of improving battery pack temperature uniformity by periodically switching the flow direction in the loop may alternatively or additionally be adopted. This method may be used for situations, e.g., when circulating coolant during battery cooling process, during battery heating up process. The idea of periodically switching the flow direction in the loop may be implemented separately or may be combined with the idea of introducing a short-cut loop (small loop) to the regular coolant loop for the battery pack. The solutions proposed in the embodiments of the present disclosure can improve temperature distribution uniformity of a battery pack and therefore benefit the customer with longer driving range and longer battery life.

In order to make those skilled in the art understand the solutions of the present disclosure more clearly, the technical solutions in the embodiments of the present disclosure are clearly and completely elaborated below in combination with the accompanying drawings. It is apparent that the described embodiments are only a part of the embodiments of the present disclosure but not all. Based on the embodiments of the present disclosure, all the other embodiments obtained by those of ordinary skill in the art on the premise of not contributing creative effort belong to the scope of protection of the present disclosure.

It is to be noted that the terms like "first" and "second" in the specification, the claims and the accompanying drawings of the present disclosure are used for differentiating the similar objects, but do not have to describe a specific order or a sequence. It should be understood that the objects may be exchanged under appropriate circumstances, so that the embodiments of the present disclosure described here may be implemented in an order different from that described or shown here. Moreover, the terms like "include" and "have" and any variation of them are intended to cover nonexclusive including; for example, the process, method, system, product or device including a series of steps or units do not have to be limited to those clearly listed steps or units, but may include other steps or units which are not clearly listed or inherent in these process, method, system, product or device.

In accordance with an embodiment of the present disclosure, a battery thermal management system is provided. The battery thermal management system may be applied in any type of batteries, such as the batteries for energy storage station, power bank, electric vehicles, electric bikes, electric robots, etc. FIG. 1 shows a schematic diagram of the structure of a battery thermal management system according to an embodiment of the present disclosure. As shown in FIG. 1, the battery thermal management system includes a battery 10, a battery thermal exchange structure 12, a pump 14, at least one first valve 16 (FIG. 1 shows one first valve 16, but two first valves 16 are also possible) and one or more thermal adjustment components 18 (FIG. 1 shows three thermal adjustment components 18, but fewer or more thermal adjustment components 18 are also possible).

The battery thermal exchange structure 12 includes a thermal exchange channel 120 passing through the battery 10, and has a first port 121 and a second port 122.

A first coolant circulation loop 1 is formed via connecting a first port 140 of the pump 14 to the first port 121 of the battery thermal exchange structure 12 and connecting a second port 142 of the pump 14 to the second port 122 of the battery thermal exchange structure 12.

A second coolant circulation loop 2 is formed via connecting the first port 140 of the pump 14 to the first port 121 of the battery thermal exchange structure 12 and sequentially connecting the second port 142 of the pump 14 to the one or more thermal adjustment components 18 and the second port 122 of the battery thermal exchange structure 12.

The first valve 16 is set at each or one of two joint locations between the first coolant circulation loop 1 and the second coolant circulation loop 2 and is configured to direct coolant flowing through the first valve 16 into either the first coolant circulation loop 1 or the second coolant circulation loop 2.

In existing battery thermal management system, various components of an existing coolant loop (a regular coolant loop), such as radiator, liquid-liquid heat exchanger, long hoses, valves, etc., can lead to significant pressure drop and energy loss. In order to circulate coolant while saving energy, some of these components can be bypassed, to save energy loss, and heat exchange to ambient. Therefore, in the scheme as shown in FIG. 1, a short-cut loop (the first coolant circulation loop 1) is provided in addition to the regular coolant loop (the first coolant circulation loop 2), and it is enabled to switch between the first coolant circulation loop 1 and the second coolant circulation loop 2 by virtue of the first valve 16, so that it is possible to use a short-cut loop (the first coolant circulation loop 1) for implementing the thermal exchange within the battery 10.

In at least one exemplary embodiment, the one or more thermal adjustment components 18 may include at least one of: a heating component, a cooling component, and a radiating component.

Due to the reason that the flowing of the coolant inside the loops in both directions can achieve the thermal exchange, the outlet of the pump can be provided in both ways too. In at least one exemplary embodiment, the first port 140 of the pump 14 is an outlet of the pump 14 and the second port 142 of the pump 14 is an inlet of the pump 14. Alternatively, the first port 140 of the pump 14 is the inlet of the pump 14 and the second port 142 of the pump 14 is the outlet of the pump 14.

Considering that the first valve 16 should be able to direct coolant flowing through the first valve 16 into either the first coolant circulation loop 1 or the second coolant circulation loop 2, as a simplest scheme, the first valve 16 may be a three-way valve. Those skilled in the art should be able to understand that any other components capable of achieving this effect can be used as the first valve 16, and the implementation of the first valve 16 should not be limited to the three-way valve.

Figure 2:
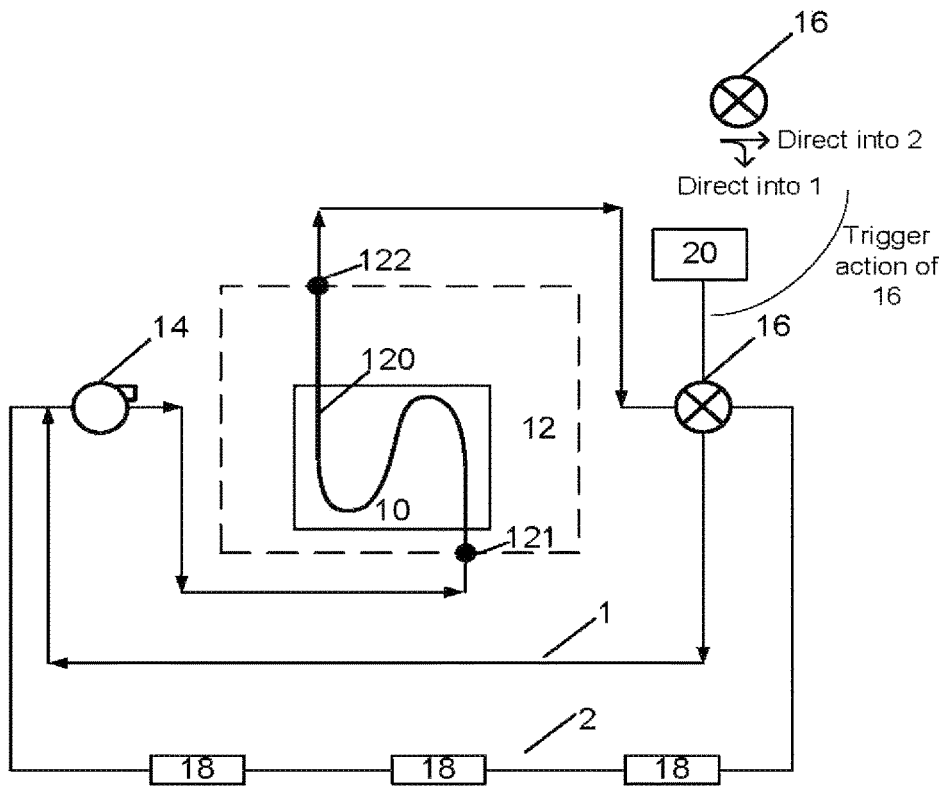
FIG. 2 is a schematic diagram of an exemplary structure of a battery thermal management system according to an embodiment of the present disclosure.

FIG. 2 shows a schematic diagram of an exemplary structure of a battery thermal management system according to an embodiment of the present disclosure. As shown in FIG. 2, in at least one exemplary embodiment, the battery thermal management system may further include a first control component 20 in connection with the first valve 16 and configured to:

determine whether active heating or cooling of the battery 10 is needed;

in a case where the active heating or cooling of the battery 10 is not needed, trigger the first valve 16 to direct the coolant flowing through the first valve 16 into the first coolant circulation loop 1; and/or, in a case where the active heating or cooling of the battery 10 is needed, trigger the first valve 16 to direct the coolant flowing through the first valve 16 into the second coolant circulation loop 2.

By virtue of the scheme, the first control component 20 can determine to trigger the first valve 16 to direct the coolant flowing through the first valve 16 into the first coolant circulation loop 1 or the second coolant circulation loop 2 based on the result of determining whether active heating or cooling of the battery 10 is needed.

Based on practical applications, the mechanism for the first control component 20 to determine whether active heating or cooling of the battery 10 is needed can be set in advance. For example, in at least one exemplary embodiment, the first control component 20 is configured to: determine that the active heating or cooling of the battery 10 is not needed in a case where a temperature of the battery 10 does not exceed a temperature threshold; and determine that the active heating or cooling of the battery 10 is needed in a case where the temperature of the battery 10 exceeds the temperature threshold. Those skilled in the art should understand that other mechanisms can be set according to practical applications, and the implementation of the first control component 20 is not limited to the scheme described herein.

There are various exemplary structures for the battery thermal exchange structure 12, which is mainly used for achieve thermal exchange within the battery 10. Some exemplary structures are described in the embodiments of the present disclosure for feasibility of understanding. The implementation for the battery thermal exchange structure 12 is not limited to the exemplary structures described herein. Based on practical application scenarios, more implementations may be adopted.

Figure 3:
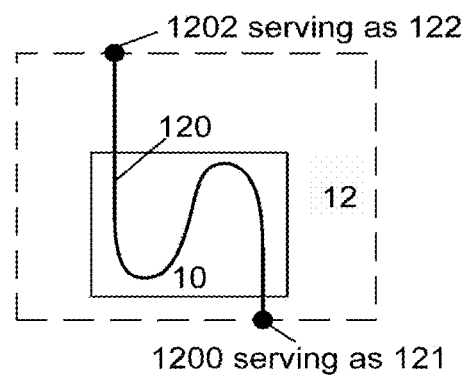
FIG. 3 is a schematic diagram for a first exemplary structure of the battery thermal exchange structure 12 in which the flowing direction of the coolant within the thermal exchange channel 120 is not alterable according to an embodiment of the present disclosure.

FIG. 3 shows a schematic diagram for a first exemplary structure of the battery thermal exchange structure 12 in which the flowing direction of the coolant within the thermal exchange channel 120 is not alterable according to an embodiment of the present disclosure. FIG. 3 shows a simplest structure for the battery thermal exchange structure 12, which is namely the structure shown in FIGS. 1 and 2. As shown in FIG. 3, in at least one exemplary embodiment, a first end 1200 and a second end 1202 of the thermal exchange channel 120 passing through the battery 10 respectively serve as the first port 121 and the second port 122 of the battery thermal exchange structure 12.

According to the structure shown in FIG. 3, the flowing direction of the coolant within the thermal exchange channel 120 is not alterable, provided that the coolant flowing into the battery thermal exchange structure 12 does not alter its flowing direction. This is a relatively simple implementation.

However, considering that coolant temperature increases along flow path during battery cooling and decreases along flow path during battery heating, which makes the cooling or heating ability of the fluid decrease along the flow path, such one-directional flow would by its nature lead to a temperature non-uniformity for the entire battery pack. In order to reduce the temperature non-uniformity inside battery pack, a novel structure of the battery thermal exchange structure 12, in which the flowing direction of the coolant within the thermal exchange channel 120 is alterable, is proposed as follows.

In at least one exemplary embodiment, the battery thermal exchange structure 12 further includes at least one second valve 40, wherein two ports of the second valve 40 are connected with a first end 1200 and a second end 1202 of the thermal exchange channel 120 passing through the battery 10, and remaining port or ports of the second valve 40 serves as the first port 121 and the second port 122 of the battery thermal exchange structure 12; the second valve 40 is configured to alter a flowing direction of the coolant within the thermal exchange channel 120 passing through the battery 10.

In at least one exemplary embodiment, the battery thermal management system further includes a second control component 42 in connection with the second valve 40 and configured to send a flowing direction altering command to the second valve 40 at a preset interval, wherein the flowing direction altering command is used for instructing the second valve 40 to alter the flowing direction of the coolant within the thermal exchange channel 120 passing through the battery 10.

The above proposed structure will be illustrated in FIGS. 4 to 9 as three alternative exemplary embodiments and described below in detail.

Figure 4:
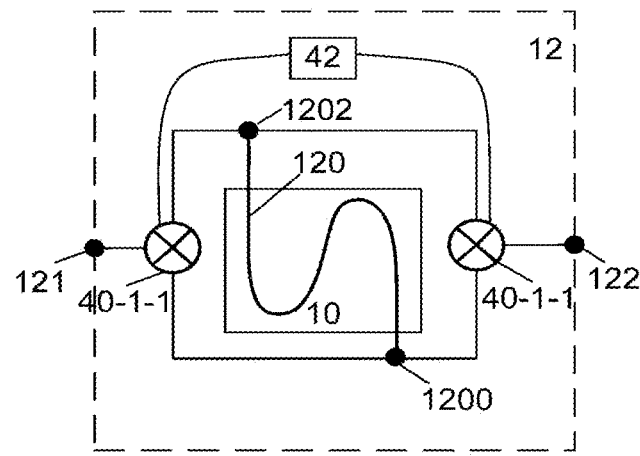
FIG. 4 is a schematic diagram for a first exemplary structure of the battery thermal exchange structure 12 in which the flowing direction of the coolant within the thermal exchange channel 120 is alterable according to an embodiment of the present disclosure.

(1) FIG. 4 shows a schematic diagram for a first exemplary structure of the battery thermal exchange structure 12 in which the flowing direction of the coolant within the thermal exchange channel 120 is alterable according to an embodiment of the present disclosure.

FIG. 4 shows a structure for the battery thermal exchange structure 12 in which two three-way valves are used to achieve the alterable direction within the thermal exchange channel 120. As shown in FIG. 4, there are two second valves 40, and the two second valves 40 are three-way valves 40-1 (a first exemplary implementation of the second valve 40), respectively being a first three-way valve 40-1-1 and a second three-way valve 40-1-2, a first port and a second port of the first three-way valve 40-1-1 are respectively connected with the first end 1200 and the second end 1202 of the thermal exchange channel 120 passing through the battery 10, and a third port of the first three-way valve 40-1-1 serves as the first port 121 of the battery thermal exchange structure 12; a first port and a second port of the second three-way valve 40-1-2 are respectively connected with the first end 1200 and the second end 1202 of the thermal exchange channel 120 passing through the battery 10, and a third port of the second three-way valve 40-1-2 serves as the second port 122 of the battery thermal exchange structure 12.

Figure 5A:
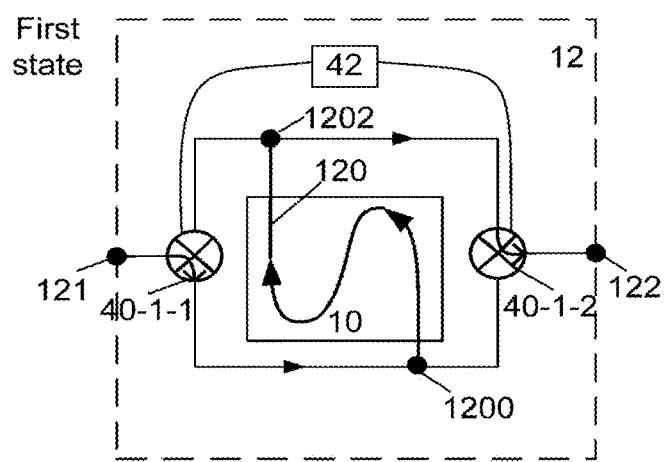
FIG. 5(a) and FIG. 5(b) are schematic diagrams showing working states of the first and second three-way valves 40-1-1/40-1-2 according to an embodiment of the present disclosure.
Figure 5B:
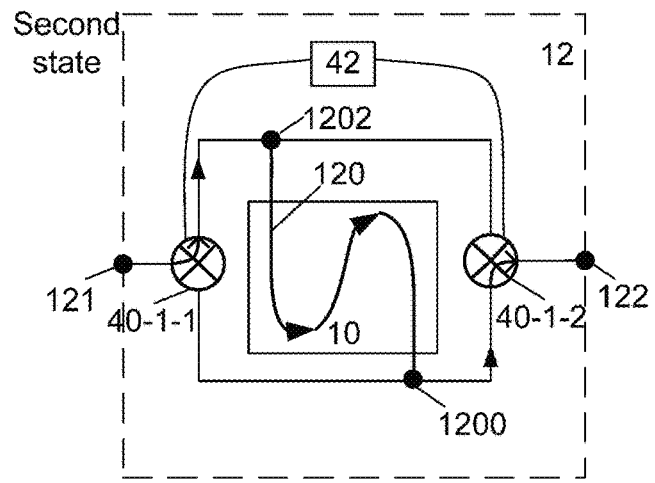

FIG. 5(a) and FIG. 5(b) show working states of the first and second three-way valves 40-1-1/40-1-2 according to an embodiment of the present disclosure. In at least one exemplary embodiment, the first three-way valve 40-1-1 has a first state in which the first and third ports of the first three-way valve 40-1-1 are connected (as shown in FIG. 5(a)) and a second state in which the second and third ports of the first three-way valve 40-1-1 are connected (as shown in FIG. 5(b)), and the second three-way valve 40-1-2 has a first state in which the second and third ports of the second three-way valve 40-1-2 are connected (as shown in FIG. 5(a)) and a second state in which the first and third ports of the second three-way valve 40-1-2 are connected (as shown in FIG. 5(b)); and the first and second three-way valves 40-1-1/40-1-2 alter the flowing direction of the coolant within the thermal exchange channel 120 passing through the battery 10 by simultaneously shifting from their respective first states to their respective second states, or from their respective second states to their respective first states.

Figure 6:
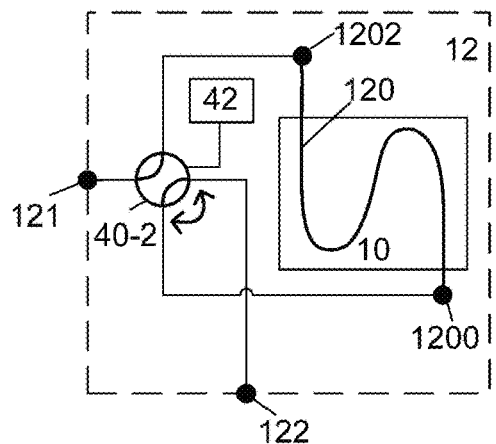
FIG. 6 is a schematic diagram for a second exemplary structure of the battery thermal exchange structure 12 in which the flowing direction of the coolant within the thermal exchange channel 120 is alterable according to an embodiment of the present disclosure.

(2) FIG. 6 is a schematic diagram for a second exemplary structure of the battery thermal exchange structure 12 in which the flowing direction of the coolant within the thermal exchange channel 120 is alterable according to an embodiment of the present disclosure.

FIG. 6 shows a structure for the battery thermal exchange structure 12 in which one four-way valve is used to achieve the alterable direction within the thermal exchange channel 120. As shown in FIG. 6, there is one second valve 40, and the second valve 40 is a four-way valve 40-2 (a second exemplary implementation of the second valve 40), a first port and a second port of the four-way valve 40-2 are respectively connected with the first end 1200 and the second end 1202 of the thermal exchange channel 120 passing through the battery 10, and a third port and a fourth port of the four-way valve 40-2 respectively serve as the first port 121 and the second port 122 of the battery thermal exchange structure 12.

Figure 7A:
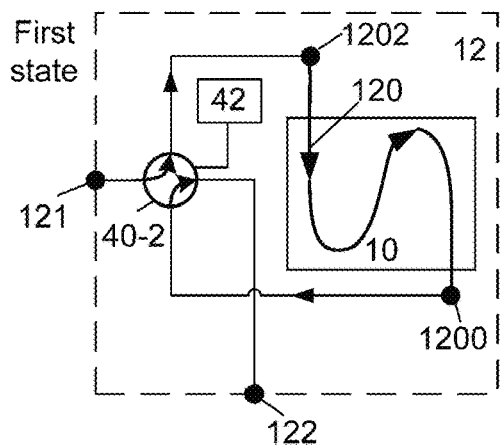
FIG. 7(a) and FIG. 7(b) are schematic diagrams showing working states of the four-way valve 40-2 according to an embodiment of the present disclosure.
Figure 7B:
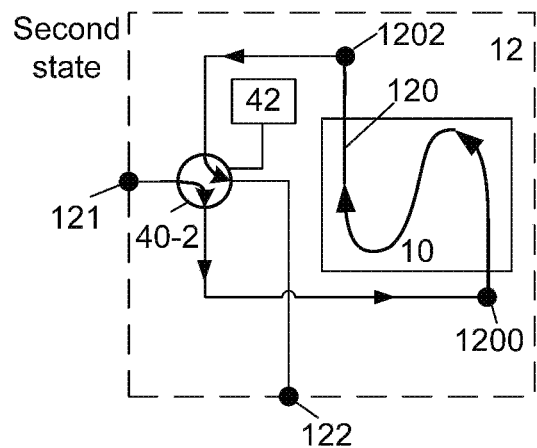

FIG. 7(a) and FIG. 7(b) show working states of the four-way valve 40-2 according to an embodiment of the present disclosure. In at least one exemplary embodiment, the four-way valve 40-2 has a first state in which the first and fourth ports of the four-way valve 40-2 are connected and the second and third ports of the four-way valve 40-2 are connected (as shown in FIG. 7(a)), and a second state in which the first and third ports of the four-way valve 40-2 are connected and the second and fourth ports of the four-way valve 40-2 are connected (as shown in FIG. 7(a)); and the four-way valve 40-2 alters the flowing direction of the coolant within the thermal exchange channel 120 passing through the battery 10 by shifting from the first state to the second state, or from the second state to the first state.

Figure 8:
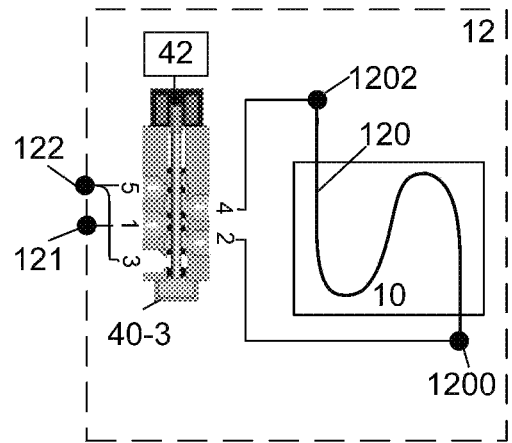
FIG. 8 is a schematic diagram for a third exemplary structure of the battery thermal exchange structure 12 in which the flowing direction of the coolant within the thermal exchange channel 120 is alterable according to an embodiment of the present disclosure.

(3) FIG. 8 is a schematic diagram for a third exemplary structure of the battery thermal exchange structure 12 in which the flowing direction of the coolant within the thermal exchange channel 120 is alterable according to an embodiment of the present disclosure.

FIG. 8 shows a structure for the battery thermal exchange structure 12 in which one five-way valve is used to achieve the alterable direction within the thermal exchange channel 120. As shown in FIG. 8, there is one second valve 40, and the second valve 40 is a five-way valve 40-3 (a third exemplary implementation of the second valve 40), a port 2 and a port 4 of the five-way valve 40-3 are respectively connected with the first end 1200 and the second end 1202 of the thermal exchange channel 120 passing through the battery 10, and a port 1 and a port 3/5 of the five-way valve 40-3 respectively serve as the first port 121 and the second port 122 of the battery thermal exchange structure 12.

Figure 9A:
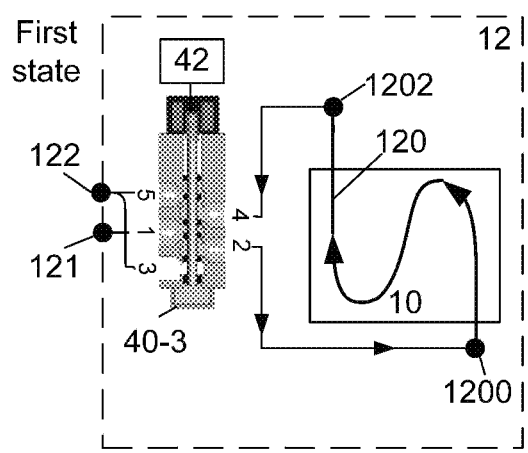

FIG. 9(a) and FIG. 9(b) show working states of the five-way valve 40-3 according to an embodiment of the present disclosure. In at least one exemplary embodiment, the five-way valve 40-3 has a first state in which the port 1 and port 4 of the five-way valve 40-3 are connected (as shown in FIG. 9(a)), and a second state in which the port 1 and port 2 of the five-way valve 40-3 are connected (as shown in FIG. 9(b)); and the five-way valve 40-3 alters the flowing direction of the coolant within the thermal exchange channel 120 passing through the battery 10 by shifting from the first state to the second state, or from the second state to the first state.

The components described as separate parts may be or may not be separate physically. The part shown as the component may be or may not be a physical component. It is possible to select, according to the actual needs, part or all of the components to achieve the objective of the solutions in the present disclosure.

Moreover, all the function components in the embodiments of the present disclosure may be integrated in a processing module; or the components exist separately and physically; or two or more than two components are integrated in a module. The integrated component may be realized in form of hardware or in form of software function component.

In accordance with another aspect of the embodiments of the present disclosure, a battery thermal management method is provided. The battery thermal management method may be applied in any type of batteries, such as the batteries for energy storage station, power bank, electric vehicles, electric bikes, electric robots, etc. The battery thermal management method is implemented in a battery thermal management system having a first coolant circulation loop and a second circulation loop, wherein the first coolant loop passes a pump and a thermal exchange channel inside a battery while bypasses one or more thermal adjustment components, and the second coolant loop passes the pump, the thermal exchange channel, and one or more thermal adjustment components. FIG. 10 shows a flowchart of a battery thermal management method according to an embodiment of the present disclosure. As shown in FIG. 10, the battery thermal management method includes an operation S1002.

In operation S1002, coolant is controlled to circulate in either the first coolant circulation loop or the second coolant circulation loop via switching of at least one valve.

In existing battery thermal management system, various components of an existing coolant loop (a regular coolant loop), such as radiator, liquid-liquid heat exchanger, long hoses, valves, etc., can lead to significant pressure drop and energy loss. In order to circulate coolant while saving energy, some of these components can be bypassed, to save energy loss, and heat exchange to ambient. Therefore, in the scheme as shown in FIG. 10, a short-cut loop (the first coolant circulation loop) is provided in addition to the regular coolant loop (the first coolant circulation loop), and it is enabled to switch between the first coolant circulation loop and the second coolant circulation loop by virtue of at least one valve, so that it is possible to use a short-cut loop (the first coolant circulation loop) for implementing the thermal exchange within the battery.

In at least one exemplary embodiment, the operation S1002 of controlling coolant to circulate in either the first coolant circulation loop or the second coolant circulation loop via switching of at least one valve may include:

S1002-1, whether active heating or cooling of the battery is needed is determined;

S1002-2, in a case where the active heating or cooling of the battery is not needed, controlling the coolant to circulate in the first coolant circulation loop via switching of the at least one valve; and/or, in a case where the active heating or cooling of the battery is needed, controlling the coolant to circulate in the second coolant circulation loop via switching of the at least one valve.

In at least one exemplary embodiment, the operation S1002-1 of determining whether active heating or cooling of the battery is needed may include:

determining that the active heating or cooling of the battery is not needed in a case where a temperature of the battery does not exceed a temperature threshold; and determining that the active heating or cooling of the battery is needed in a case where the temperature of the battery exceeds the temperature threshold.

considering that coolant temperature increases along flow path during battery cooling and decreases along flow path during battery heating, which makes the cooling or heating ability of the fluid decrease along the flow path, one-directional flow would by its nature lead to a temperature non-uniformity for the entire battery pack. In order to reduce the temperature non-uniformity inside battery pack, a novel method, which makes the flowing direction of the coolant within the thermal exchange channel alterable, is proposed as follows. In at least one exemplary embodiment, the battery thermal management method further includes:

alternately switching a flowing direction of the coolant within the thermal exchange channel passing through the battery.

In at least one exemplary embodiment, alternately switching a flowing direction of the coolant within the thermal exchange channel passing through the battery may include:

alternately switching the flowing direction of the coolant within the thermal exchange channel passing through the battery via connecting two three-way valves, or a four-way valve, or a five-way valve with two ends of the thermal exchange channel.

Other aspects of battery thermal management method can be obtained based on description in the previous embodiments for the battery thermal management system, and thus will not be repeated herein.

It is to be noted that for the sake of simple description, each aforementioned embodiment of the method is described as a series of action combinations. But those skilled in the art should know that the present disclosure is not limited to a sequence of the described actions, it is because some steps may be performed in other sequences or simultaneously according to the present disclosure. Besides, those skilled in the art should also know that all the embodiments described in the specification are preferred embodiments, and the actions and modules involved may not be necessary.

According to still another embodiment of the present disclosure, a detailed battery thermal management scheme is described as follows.

The battery thermal management scheme improves battery temperature uniformity by two methods:

(a) circulating the coolant in short closed coolant loop using a bypass (short-cut flow path) to save pumping power and energy loss, and (b) alternately switching the direction of flow direction in the coolant loop, to reduce the temperature gradient associated to flow direction.

The two methods can be used separately or can be combined to improve battery temperature uniformity. Theoretically the scheme is not limited to liquid-phase, and can be used for various type of coolant type, e.g., liquid, gas or multi-phase flow coolant.

Figure 11B:
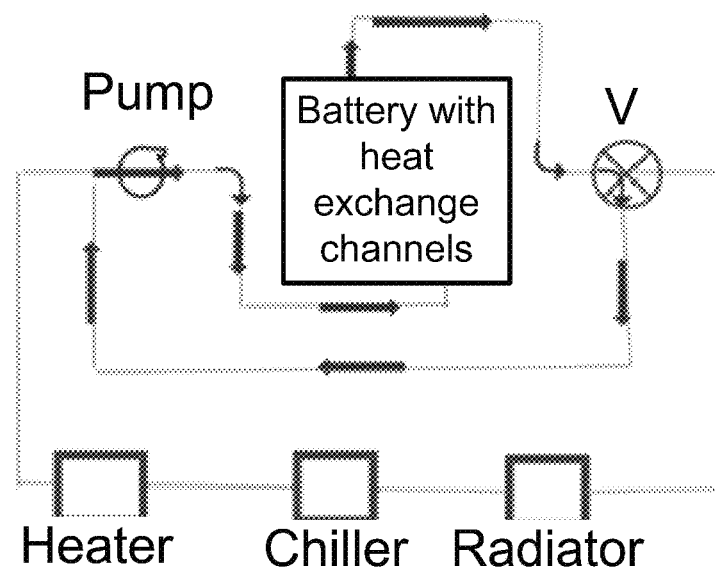

FIG. 11 shows an example of the first method, circulating the coolant in a shorter short-cut loop, with smaller energy consumption. FIG. 11(*a*) shows circulating coolant in the commonly used loop for battery thermal management. Coolant circulates through pump, battery heat exchange channels, radiator, chiller and heater. As an example, FIG. 11(*b*) shows improved coolant loop which has a short-cut flow path, forming a smaller coolant loop. The coolant circulates only through the pump and battery heat exchange channels, by passed the unnecessary components.

In certain situations, when the battery temperature is within its limit, active heating or cooling of battery pack is not needed. In these situations, circulating coolants in the short-cut loop can reduce the battery's internal temperature uniformity caused by battery heat generation and can save energy.

Figure 12:
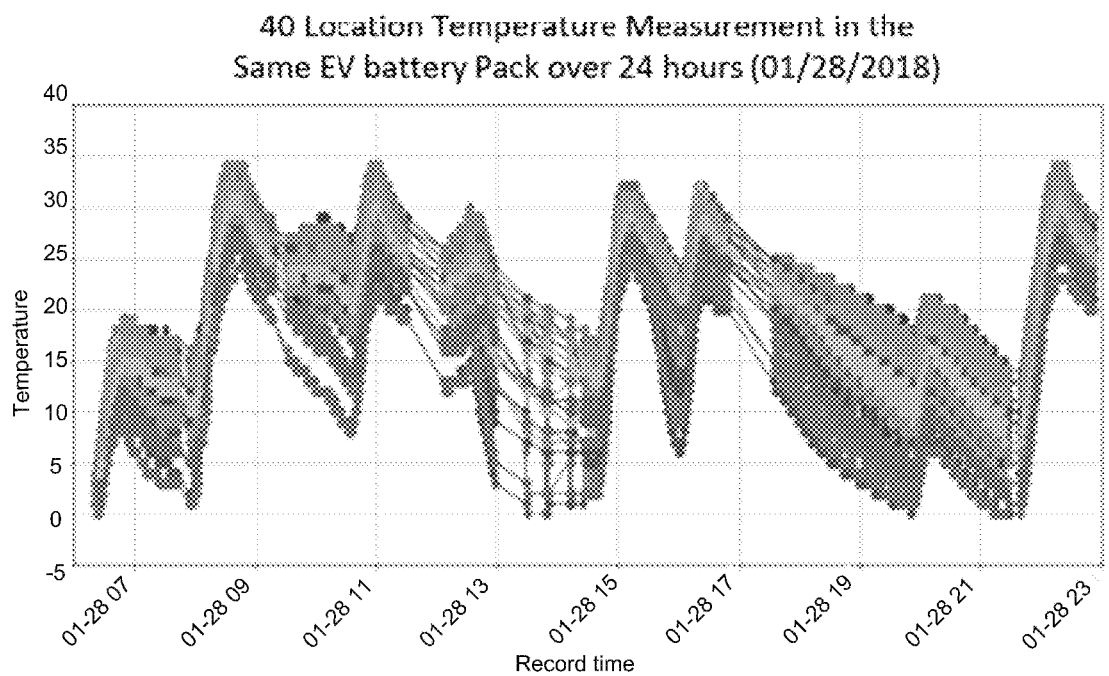
FIG. 12 is a schematic diagram showing the measured temperature of an EV battery pack over 24 hour period (temperatures at 40 location monitored simultaneously.

The temperature non-uniformity could be caused by internal heat generation of battery, variation in thermal insulation of battery pack, intrinsic variation of battery cells (from manufacturing and how the battery are used), heat exchange variation with the coolant, etc. FIG. 12 shows the measured temperature of an EV battery pack over 24 hour period (temperatures at 40 location monitored simultaneously. Battery pack has 20 modules with each module having two measurement locations). As shown, the temperature variation in the same pack at the same moment could be ~20° C. This means there is absolutely a need to improve the temperature uniformity inside battery pack.

Figure 13:
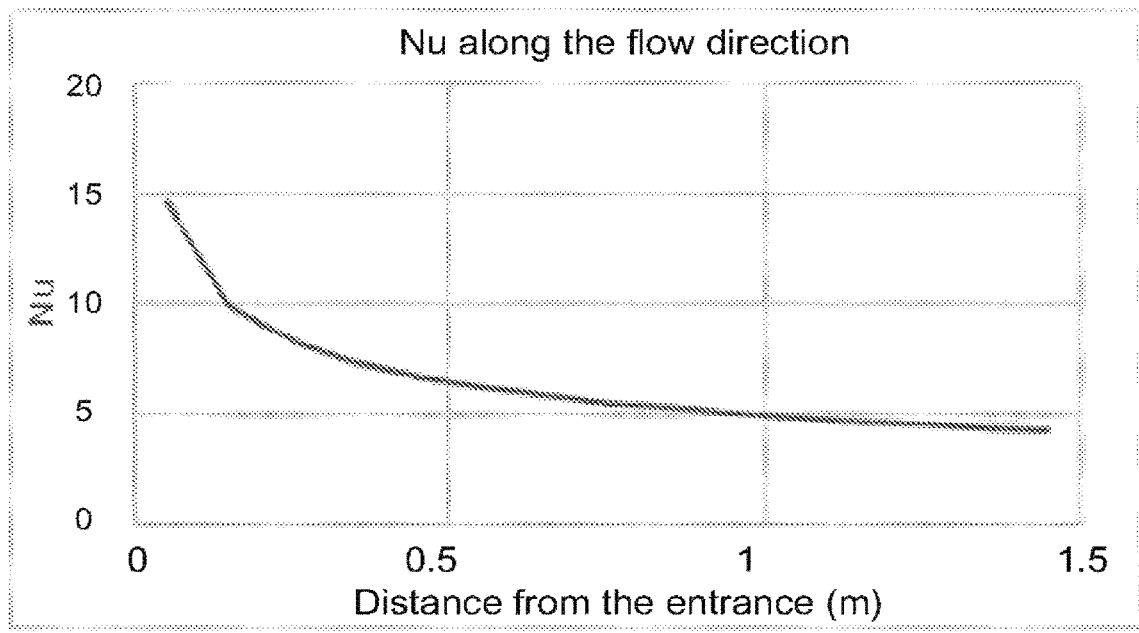
FIG. 13 is a schematic diagram showing a calculated Nu number along the entrance channel (laminar flow, circular tube inner diameter ~5 mm, channel length ~1.5 m)

From heat transfer theory, most current common loop is one-directional as shown in FIG. 11(a). Such design, by nature, will have a decreasing heat transfer along the heat exchanger flow path due to two facts:

(1) Along the flow path, the temperature difference ΔT between battery and coolant decrease since flow is heated or cooled along the flow path;

(2) Along the flow path the local heat transfer coefficient decreases. For flow channel in a cold plate or similar device, there is usually an entrance effect along the heat exchange channel. FIG. 13 shows a calculated Nu number along the entrance channel (laminar flow, circular tube inner diameter ~5 mm, channel length ~1.5 m). It shows a 3× difference between the entrance and exit of the channel. So the heat transfer coefficient keeps decreasing in the thermal boundary developing zone along the flow path.

The combination of temperature change and heat exchange coefficient reduction cause the heat exchange rate variation along the flow direction for the battery pack, and therefore cause the battery temperature variation along the flow direction for the battery pack.

Figure 14A:
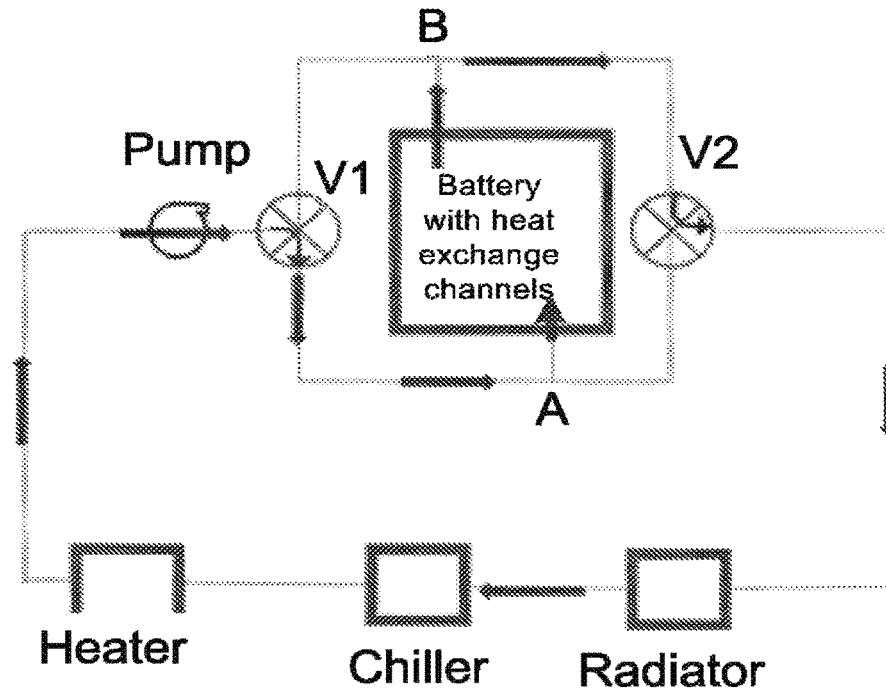
FIG. 14(a) and FIG. 14(b) are schematic diagrams respectively showing an example of the second method, i.e., alternating the flow direction periodically.
Figure 14B:
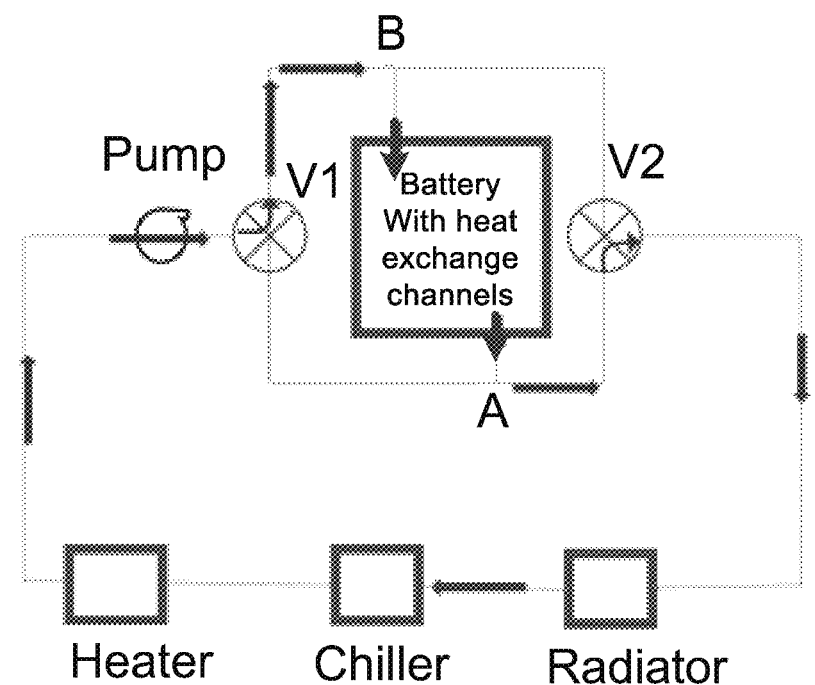

FIG. 14(a) and FIG. 14(b) respectively show an example of the second method, i.e., alternating the flow direction periodically. In the example, two valves (3-way valves or others of similar function) are utilized to change the direction of flow inside the battery heat exchange channels. So that the time-averaged overall variation of heat exchange rate along the flow path is drastically reduced. Accordingly, the overall temperature uniformity of battery pack is improved. It needs to be noted that in this particular example, the flow direction in heater, chiller, and radiator is still the same direction, for both FIGS. 14(a) and 14(b).

Figure 15A:
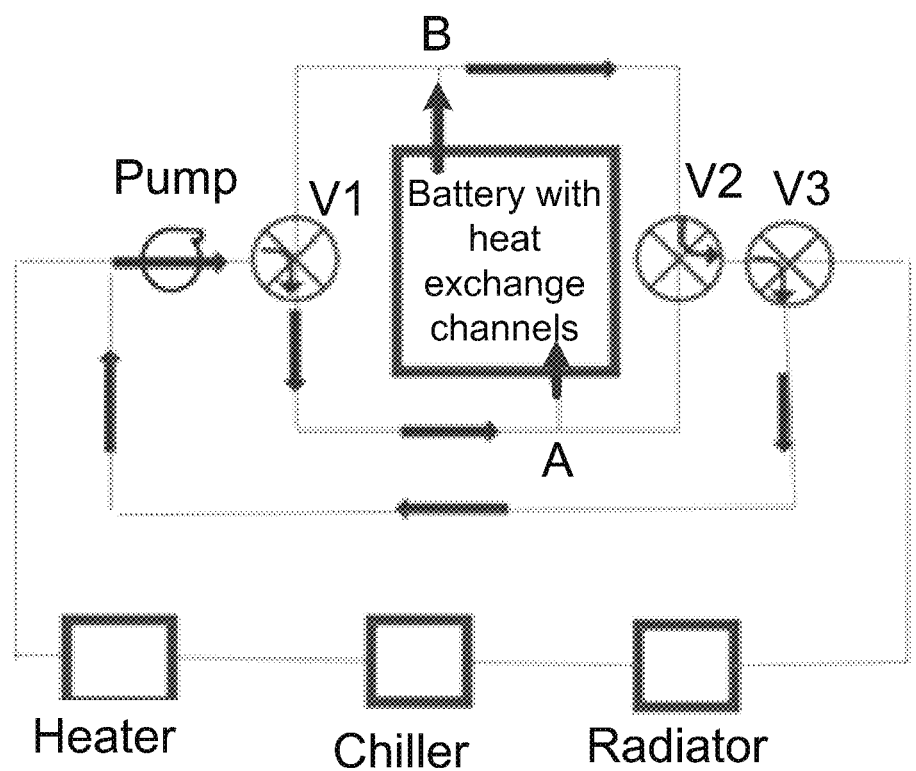
FIG. 15(a) and FIG. 15(b) are schematic diagrams respectively showing an example which is a combination of the two methods, i.e., alternating the flow direction in a short-cut loop.
Figure 15B:
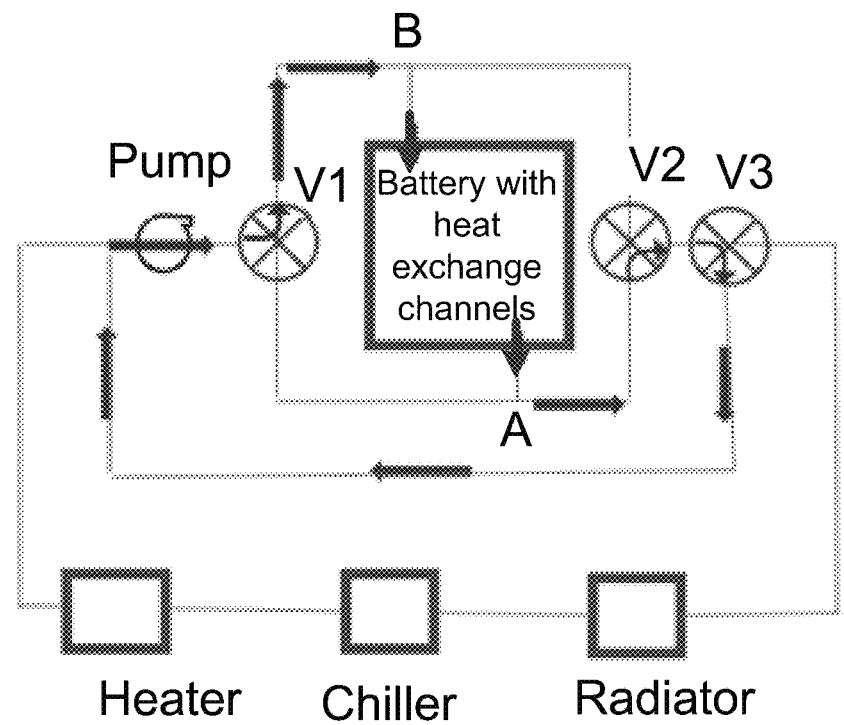

The two methods can also be combined as needed. FIG. 15(a) and FIG. 15(b) respectively show an example which is a combination of the two methods, i.e., alternating the flow direction in a short-cut loop. There may be other variant combinations. The combination will benefit the battery temperature uniformity when the battery temperature is within the operation limit and no heating or cooling is needed.

Figure 16A:
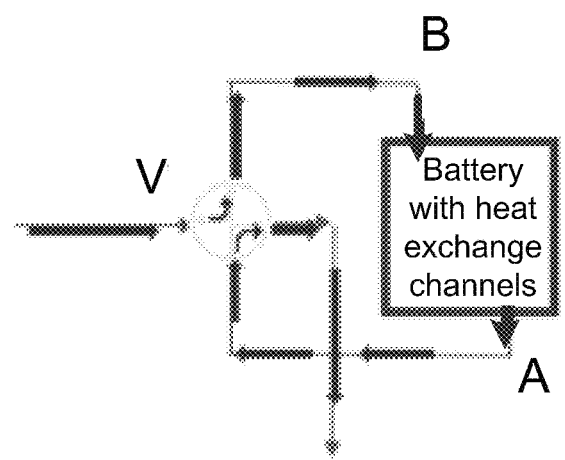
FIG. 16(a) and FIG. 16(b) are schematic diagrams respectively showing how the flow direction is changed by a four-way valve.
Figure 16B:
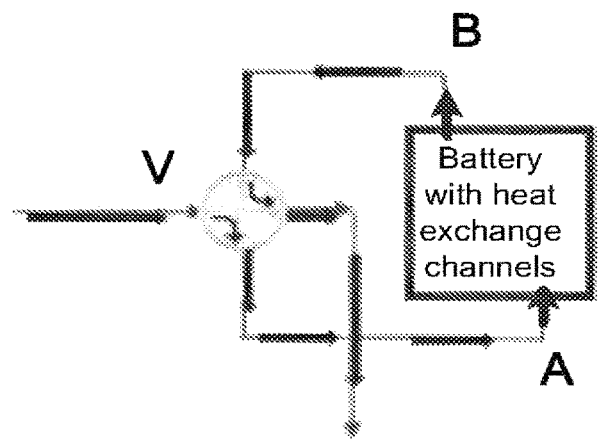
Figure 17A:
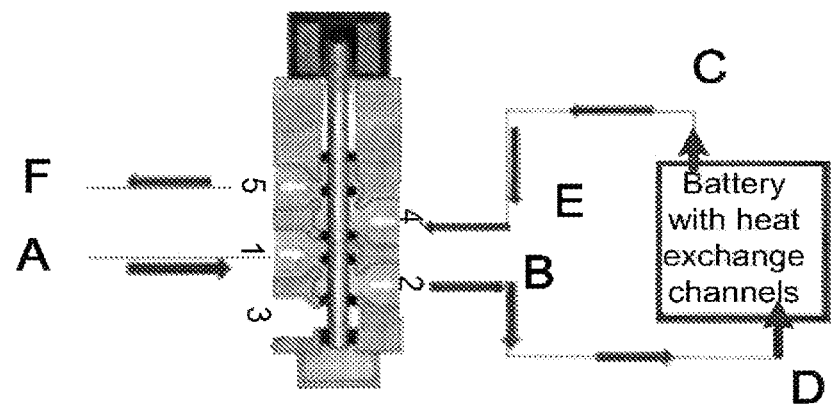
FIG. 17(a) and FIG. 17(b) are schematic diagrams respectively showing how the flow direction is changed by a five-way valve.
Figure 17B:
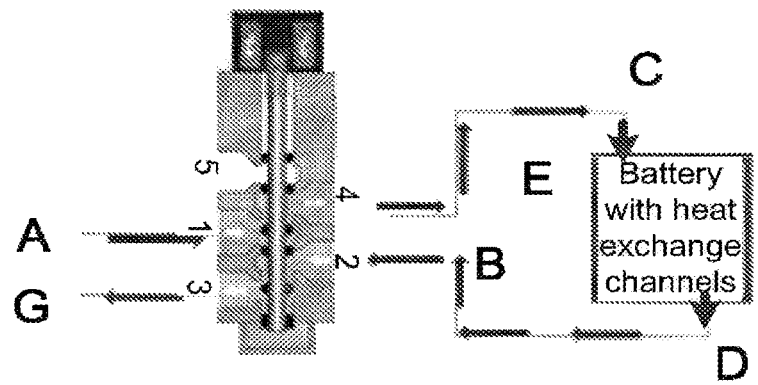

In FIGS. 14 and 15, the flow direction inside the heat exchange channels is alternated through implementation of three-way valves. The flow direction can also be alternated with a four-way valve or a five-way valve. As an example, FIG. 16(a) and FIG. 16(b) respectively show how the flow direction is changed by a four-way valve, and FIG. 17(a) and FIG. 17(b) respectively show how the flow direction is changed by a five-way valve.

Lots of current battery pack's cooling system can be adapted to use these schemes to improve battery pack temperature uniformity. The change to be made is totally on the cooling system. There is no change to battery pack itself. So it can help to improve battery pack's life and range, with minimal cost addition and zero change to the battery pack itself.

The above is only the preferred embodiments of the present disclosure; it should be indicated that, on the premise of not departing from the principles of the present disclosure, those of ordinary skill in the art may also make a number of improvements and supplements, and these improvements and supplements should fall within the scope of protection of the present disclosure.

What is claimed is:

1. A battery thermal management system, comprising: a battery, a battery thermal exchange structure, a pump, at least one first valve and three thermal adjustment components, wherein the battery thermal exchange structure comprises a thermal exchange channel passing through the battery, and has a first port and a second port;

a first coolant circulation loop is formed via connecting a first port of the pump to the first port of the battery thermal exchange structure and connecting a second port of the pump to the second port of the battery thermal exchange structure, and a second coolant circulation loop is formed via connecting the first port of the pump to the first port of the battery thermal exchange structure and sequentially connecting the second port of the pump to the three thermal adjustment components and the second port of the battery thermal exchange structure, wherein the three thermal adjustment components comprise a heating component, a cooling component, and a radiating component which are connected in series;

the at least one first valve is set at one of two joint locations between the first coolant circulation loop and the second coolant circulation loop and is configured to switch between the first coolant circulation loop and the second coolant circulation loop to direct coolant flowing into either the first coolant circulation loop or the second coolant circulation loop.

2. The battery thermal management system as claimed in claim 1, wherein the first port of the pump is an outlet of the pump and the second port of the pump is an inlet of the pump, or the first port of the pump is the inlet of the pump and the second port of the pump is the outlet of the pump.

3. The battery thermal management system as claimed in claim 1, wherein the at least one first valve is a three-way valve.

4. The battery thermal management system as claimed in claim 1, further comprising a first control component in connection with the at least one first valve, and the first control component is programmed to:

determine whether active heating or cooling of the battery is needed;

in a case where the active heating or cooling of the battery is not needed, trigger the at least one first valve to direct the coolant flowing through the at least one first valve into the first coolant circulation loop; and, in a case where the active heating or cooling of the battery is needed, trigger the at least one first valve to direct the coolant flowing through the at least one first valve into the second coolant circulation loop.

5. The battery thermal management system as claimed in claim 4, wherein the first control component is further programmed to:

determine that the active heating or cooling of the battery is not needed in a case where a temperature of the battery does not exceed a temperature threshold; and determine that the active heating or cooling of the battery is needed in a case where the temperature of the battery exceeds the temperature threshold.

6. The battery thermal management system as claimed in claim 1, wherein a first end and a second end of the thermal exchange channel passing through the battery respectively serve as the first port and the second port of the battery thermal exchange structure.

7. The battery thermal management system as claimed in claim 1, wherein the battery thermal exchange structure further comprises at least one second valve, wherein two ports of the at least one second valve are connected with a first end and a second end of the thermal exchange channel passing through the battery, and remaining ports of the at least one second valve serves as the first port and the second port of the battery thermal exchange structure;

the at least one second valve is configured to alter a flowing direction of the coolant within the thermal exchange channel passing through the battery.

8. The battery thermal management system as claimed in claim 7, further comprising a second control component in connection with the at least one second valve and configured to send a flowing direction altering command to the at least one second valve at a preset interval, wherein the flowing direction altering command is used for instructing the at least one second valve to alter the flowing direction of the coolant within the thermal exchange channel passing through the battery.

9. The battery thermal management system as claimed in claim 7, wherein there are two second valves, and the two second valves are three-way valves, respectively being a first three-way valve and a second three-way valve, a first port and a second port of the first three-way valve are respectively connected with the first end and the second end of the thermal exchange channel passing through the battery, and a third port of the first three-way valve serves as the first port of the battery thermal exchange structure;

a first port and a second port of the second three-way valve are respectively connected with the first end and the second end of the thermal exchange channel passing through the battery, and a third port of the second three-way valve serves as the second port of the battery thermal exchange structure.

10. The battery thermal management system as claimed in claim 9, wherein the first three-way valve has a first state in which the first and third ports of the first three-way valve are connected and a second state in which the second and third ports of the first three-way valve are connected, and the second three-way valve has a first state in which the second and third ports of the second three-way valve are connected and a second state in which the first and third ports of the second three-way valve are connected; and the first and second three-way valves alter the flowing direction of the coolant within the thermal exchange channel passing through the battery by simultaneously shifting from their respective first states to their respective second states, or from their respective second states to their respective first states.

11. The battery thermal management system as claimed in claim 7, wherein there is one second valve, and the second valve is a four-way valve, a first port and a second port of the four-way valve are respectively connected with the first end and the second end of the thermal exchange channel passing through the battery, and a third port and a fourth port of the four-way valve respectively serve as the first port and the second port of the battery thermal exchange structure.

12. The battery thermal management system as claimed in claim 11, wherein the four-way valve has a first state in which the first and fourth ports of the four-way valve are connected and the second and third ports of the four-way valve are connected, and a second state in which the first and third ports of the four-way valve are connected and the second and fourth ports of the four-way valve are connected; and the four-way valve alters the flowing direction of the coolant within the thermal exchange channel passing through the battery by shifting from the first state to the second state, or from the second state to the first state.

13. The battery thermal management system as claimed in claim 7, wherein there is one second valve, and the second valve is a five-way valve, a port 2 and a port 4 of the five-way valve are respectively connected with the first end and the second end of the thermal exchange channel passing through the battery, and a port 1 and a port 3/5 of the five-way valve respectively serve as the first port and the second port of the battery thermal exchange structure.

14. The battery thermal management system as claimed in claim 13, wherein the five-way valve has a first state in which the port 1 and port 4 of the five-way valve are connected, and a second state in which the port 1 and port 2 of the five-way valve are connected; and the five-way valve alters the flowing direction of the coolant within the thermal exchange channel passing through the battery by shifting from the first state to the second state, or from the second state to the first state.

* * * * *